United States Patent
Suzuki et al.

(10) Patent No.: US 10,703,631 B2
(45) Date of Patent: Jul. 7, 2020

(54) NEON RECOVERING/PURIFYING SYSTEM AND NEON RECOVERING/PURIFYING METHOD

(71) Applicant: L'Air Liquide, Société Anonyme pour l'Etude et l'Exploitation des Procédés Georges Claude, Paris (FR)

(72) Inventors: Sayaka Suzuki, Tokyo (JP); Terumasa Koura, Tokyo (JP); Fumikazu Nozawa, Tokyo (JP)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 178 days.

(21) Appl. No.: 15/771,545

(22) PCT Filed: Sep. 13, 2016

(86) PCT No.: PCT/EP2016/071503
§ 371 (c)(1),
(2) Date: Apr. 27, 2018

(87) PCT Pub. No.: WO2017/071866
PCT Pub. Date: May 4, 2017

(65) Prior Publication Data
US 2018/0354795 A1   Dec. 13, 2018

(30) Foreign Application Priority Data

Oct. 30, 2015 (JP) ................................. 2015-214129

(51) Int. Cl.
*C01B 23/00* (2006.01)
*B01D 53/04* (2006.01)
*B01D 53/02* (2006.01)

(52) U.S. Cl.
CPC ............ *C01B 23/001* (2013.01); *B01D 53/02* (2013.01); *B01D 2256/18* (2013.01);
(Continued)

(58) Field of Classification Search
CPC ........ B01D 53/75; B01D 53/02; B01D 53/04; B01D 2256/18; B01D 2257/104;
(Continued)

(56) References Cited

U.S. PATENT DOCUMENTS

| 4,629,611 A * | 12/1986 | Fan ......................... H01S 3/225 372/59 |
| 4,740,982 A * | 4/1988 | Hakuta .................... H01S 3/225 372/55 |

(Continued)

FOREIGN PATENT DOCUMENTS

| EP | 0 242 028 | 10/1987 |
| EP | 0 565 242 | 10/1993 |

(Continued)

OTHER PUBLICATIONS

International Search Report and Written Opinion for corresponding PCT/EP2016/071503, dated Dec. 20, 2016.

*Primary Examiner* — Frank M Lawrence, Jr.
(74) *Attorney, Agent, or Firm* — Patricia E. McQueeney

(57) ABSTRACT

A neon recovering/purifying system including: a recovery vessel that is arranged on an exhaust gas route and stores exhaust gas, the exhaust gas route being branched and extending from a discharge line; a compressor that increases a pressure of the exhaust gas sent out from the recovery vessel, to a third pressure; an exhaust gas flow rate regulating unit that regulates a flow rate of the exhaust gas whose pressure has been increased by the compressor; a first impurity removing unit that removes a first impurity from the exhaust gas; a second impurity removing unit that
(Continued)

removes a second impurity from the exhaust gas from which the first impurity has been removed; a pressure increasing vessel that stores purified gas that has been processed by the first impurity removing unit and the second impurity removing unit; a pressure reducing valve that reduces a pressure of the purified gas sent out from the pressure increasing vessel, to the first pressure; and a purified gas flow rate regulating unit that regulates a flow rate of the purified gas supplied to a supply line of a manufacturing system.

19 Claims, 2 Drawing Sheets

(52) U.S. Cl.
CPC .... *B01D 2257/104* (2013.01); *B01D 2257/11* (2013.01); *B01D 2258/0216* (2013.01); *C01B 2210/005* (2013.01); *C01B 2210/0006* (2013.01); *C01B 2210/0017* (2013.01); *C01B 2210/0023* (2013.01); *C01B 2210/0032* (2013.01); *C01B 2210/0045* (2013.01); *C01B 2210/0046* (2013.01); *C01B 2210/0051* (2013.01); *C01B 2210/0062* (2013.01); *C01B 2210/0084* (2013.01)

(58) Field of Classification Search
CPC ........ B01D 2257/11; B01D 2258/0216; C01B 23/001; C01B 2210/0006; C01B 2210/0017; C01B 2210/0023; C01B 2210/0032; C01B 2210/0045; C01B 2210/0046; C01B 2210/005; C01B 2210/0051; C01B 2210/0062; C01B 2210/0084

USPC .................. 95/90, 127, 138; 96/108, 132
See application file for complete search history.

(56) References Cited

U.S. PATENT DOCUMENTS

| | | | |
|---|---|---|---|
| 6,217,633 B1* | 4/2001 | Ohmi | B01J 3/00 95/127 |
| 2002/0035921 A1* | 3/2002 | Ishihara | B01D 53/22 95/45 |
| 2006/0130649 A1* | 6/2006 | Jain | B01D 53/025 95/82 |
| 2006/0165573 A1* | 7/2006 | Ohmi | B01D 53/04 423/210 |
| 2017/0133813 A1* | 5/2017 | Weyrauch | H01S 3/036 |

FOREIGN PATENT DOCUMENTS

| | | | |
|---|---|---|---|
| JP | 11-54851 A | * | 2/1999 |
| JP | 2001 232134 | | 8/2001 |
| JP | 2008 168169 | | 7/2008 |
| JP | 2010 241686 | | 10/2010 |

\* cited by examiner

NEON RECOVERING/PURIFYING SYSTEM AND NEON RECOVERING/PURIFYING METHOD

CROSS REFERENCE TO RELATED APPLICATIONS

This application is a 371 of International PCT Application PCT/EP2016/071503, filed Sep. 13, 2016, which claims priority to Japanese Patent Application No. JP 2015-214129, filed Oct. 30, 2015, the entire contents of which are incorporated herein by reference.

BACKGROUND

The present invention relates to a system that recovers and purifies neon from exhaust gas discharged from, for example, a semiconductor manufacturing apparatus having an excimer laser mounted thereon, and to a system installed in a factory in which a semiconductor manufacturing apparatus is installed and a neon recovering/purifying method.

JP-A-2001-232134 describes an example neon recovering apparatus that recovers high-purity neon from gas discharged from a KrF excimer laser oscillator.

Moreover, JP-A-2010-241686 describes that, when high-value added gas of at least one kind of krypton, xenon, and neon is separated and purified for recovering from exhaust gas discharged from a manufacturing facility for semiconductor products or display apparatuses that uses the high-value added gas as atmospheric gas, a slight amount of impurities such as nitrogen oxide, ammonia, oxygen, nitrogen, hydrogen, helium, and moisture contained in the exhaust gas are efficiently removed, and the high-value added gas is continuously separated and purified for recovering with a high recovery rate.

The following is described in JP-A-2001-232134. Because the amount of exhaust gas discharged from a KrF excimer laser oscillator in one factory is not large, it is more efficient to put together and purify exhaust gases from several factories, compared with installing the neon recovering apparatus as one facility in each factory. Hence, exhaust gas is once stored in a gas cylinder, and is transported to another gas purifying factory. Then, a neon recovering process is performed on the transported gases all together by the neon recovering apparatus installed in the gas purifying factory. In this way, efficient recovery is achieved.

The following is described in JP-A-2010-241686. Ammonia and moisture are removed using an adsorbent from exhaust gas discharged from a semiconductor manufacturing facility. Subsequently, high-value added gas (such as neon) is selectively adsorbed onto an adsorbent from the exhaust gas, and the high-value added gas is desorbed.

Further, impurities are removed by adsorption using an adsorbent onto which the high-value added gas (neon) is not easily adsorbed. In this way, the high-value added gas is separated and purified. That is, in addition to the adsorption of the impurities other than the high-value added gas, even the high-value added gas is selectively adsorbed.

Hence, complicated steps are necessary, and costs for the separation and purification are inevitably high.

SUMMARY

The present invention, which has been made in view of the above-mentioned actual circumstances, has an object to provide a neon recovering/purifying system capable of being connected to a manufacturing system such as a semiconductor manufacturing apparatus, recovering neon from exhaust gas discharged from the manufacturing system, and supplying the recovered neon to the manufacturing system, without the need to separate and purify impurities more than necessary, while adopting a system configuration simpler than conventional configurations.

A neon recovering/purifying system according to the first invention, that recovers and purifies neon from exhaust gas discharged from a manufacturing system including: a supply line that supplies mixed noble gas containing at least neon and first noble gas, at a first pressure; a laser apparatus that uses the mixed noble gas; and a discharge line that discharges at least exhaust gas discharged from the laser apparatus, at a second pressure that is equal to or higher than an atmospheric pressure and equal to or lower than the first pressure, the neon recovering/purifying system including:

a recovery vessel that is arranged on an exhaust gas route and stores the exhaust gas, the exhaust gas route being branched and extending from the discharge line;

a compressor that is arranged on an exhaust gas route downstream side of the recovery vessel and increases a pressure of the exhaust gas sent out from the recovery vessel, to a third pressure;

an exhaust gas flow rate regulating unit that is arranged on the exhaust gas route downstream side of the compressor and regulates a flow rate of the exhaust gas that is sent to the exhaust gas route downstream side and whose pressure has been increased by the compressor;

a first impurity removing unit that is arranged on the exhaust gas route downstream side of the exhaust gas flow rate regulating unit and removes a first impurity from the exhaust gas;

a second impurity removing unit that is arranged on the exhaust gas route downstream side of the first impurity removing unit and removes a second impurity from the exhaust gas from which the first impurity has been removed;

a pressure increasing vessel that is arranged on a purified gas route downstream side of the second impurity removing unit and stores purified gas that has been processed by the first impurity removing unit and the second impurity removing unit;

pressure reducing means that is arranged on the purified gas route downstream side of the pressure increasing vessel and reduces a pressure of the purified gas sent out from the pressure increasing vessel, to the first pressure; and a purified gas flow rate regulating unit that is arranged on the purified gas route downstream side of the pressure reducing means and regulates a flow rate of the purified gas supplied to the supply line of the manufacturing system.

According to this configuration, because the recovery vessel is provided, the exhaust gas can be stored. Then, when the amount of the exhaust gas reaches a given amount, the pressure of the exhaust gas can be increased by the compressor to a given pressure equal to or higher than the first pressure, and the exhaust gas can be continuously sent at a given flow rate by the exhaust gas flow rate regulating unit to the first impurity removing unit and the second impurity removing unit in the subsequent stage.

Hence, the impurity removing process performance can be secured, and the purified gas of neon gas can be favorably obtained. Further, the purified gas can be stored in the pressure increasing vessel.

Then, when the amount of the purified gas reaches a given amount, the pressure of the purified gas can be reduced by the pressure reducing means to the first pressure, and the purified gas can be sent at a given flow rate by the purified gas flow rate regulating unit to the supply line.

Hence, the mixing of the mixed noble gas and the purified gas can be controlled with high accuracy. As a result, it is possible to connect to the manufacturing system such as a semiconductor manufacturing apparatus, separate components other than neon from the exhaust gas, favorably recovery neon, and supply the recovered neon to the manufacturing system again, while adopting a configuration simpler than conventional configurations.

A neon recovering/purifying system according to the second invention, that recovers and purifies neon from exhaust gas discharged from a manufacturing system including: a supply line that supplies mixed noble gas containing at least neon and first noble gas, at a first pressure; a laser apparatus that uses the mixed noble gas; and a discharge line that discharges at least exhaust gas discharged from the laser apparatus, at a second pressure that is equal to or higher than an atmospheric pressure and equal to or lower than the first pressure, the neon recovering/purifying system including:

a recovery vessel that is arranged on an exhaust gas route and stores the exhaust gas, the exhaust gas route being branched and extending from the discharge line;

a compressor that is arranged on an exhaust gas route downstream side of the recovery vessel and increases a pressure of the exhaust gas sent out from the recovery vessel, to a third pressure;

a pressure increasing vessel that is arranged on the exhaust gas route downstream side of the compressor and stores the exhaust gas whose pressure has been increased by the compressor;

an exhaust gas flow rate regulating unit that is arranged on the exhaust gas route downstream side of the pressure increasing vessel and regulates a flow rate of the exhaust gas sent to the exhaust gas route downstream side;

a first impurity removing unit that is arranged on the exhaust gas route downstream side of the exhaust gas flow rate regulating unit and removes a first impurity from the exhaust gas;

a second impurity removing unit that is arranged on the exhaust gas route downstream side of the first impurity removing unit and removes a second impurity from the exhaust gas from which the first impurity has been removed;

pressure reducing means that is arranged on a purified gas route downstream side of the second impurity removing unit and reduces a pressure of the purified gas sent out from the second impurity removing unit, to the first pressure; and a purified gas flow rate regulating unit that is arranged on the purified gas route downstream side of the pressure reducing means and regulates a flow rate of the purified gas supplied to the supply line of the manufacturing system.

According to this configuration, because the recovery vessel is provided, the exhaust gas can be stored. Then, when the amount of the exhaust gas reaches a given amount, the pressure of the exhaust gas can be increased by the compressor to a given pressure equal to or higher than the first pressure, the resultant exhaust gas can be stored in the pressure increasing vessel, and the stored exhaust gas can be continuously sent at a given flow rate by the exhaust gas flow rate regulating unit to the first impurity removing unit and the second impurity removing unit in the subsequent stage. Hence, the impurity removing process performance can be secured, and the purified gas of neon gas can be favorably obtained.

Further, the pressure of the purified gas can be reduced by the pressure reducing means arranged in the subsequent stage of the second impurity removing unit, to the first pressure, and the purified gas can be sent at a given flow rate by the purified gas flow rate regulating unit to the supply line. Hence, the mixing of the mixed noble gas and the purified gas can be controlled with high accuracy.

As a result, it is possible to connect to the manufacturing system such as a semiconductor manufacturing apparatus, separate components other than neon from the exhaust gas, favorably recovering neon, and supply the recovered neon to the manufacturing system again, while adopting a configuration simpler than conventional configurations.

In the second invention, it is preferable that the pressure increasing vessel be arranged in the immediate vicinity of the compressor on the exhaust gas route downstream side.

The term "immediate vicinity" refers to, for example, that the length of a pipe that couples the compressor and the pressure increasing vessel is within 50 m, preferably within 30 m, and more preferably within 20 m.

In the first and second inventions, an example of the pressure reducing means include a pressure reducing valve.

In the first and second inventions, the following configurations are given as examples.

The mixed noble gas contains neon as its main component and the first noble gas at 1 to 10% and preferably 1 to 8% to the total amount. The mixed noble gas may contain impurities. Examples of the impurities contained in the mixed noble gas include nitrogen, oxygen, carbon monoxide, carbon dioxide, and water.

The first noble gas contains, for example, any one kind or more kinds of argon (Ar), xenon (Xe), and krypton (Kr).

The blend ratio of the first noble gas is, for example, a blend ratio in which: argon is 1 to 5% to the mixed noble gas total amount; xenon is 1 to 15% to the mixed noble gas total amount; and xenon is 1 ppm to 100 ppm.

Examples of the manufacturing system include a semiconductor manufacturing apparatus such as a semiconductor exposure apparatus, a high-precision processing apparatus, and a surgical medical apparatus.

Examples of the laser apparatus include an apparatus including a krypton fluoride (KrF) excimer laser oscillator.

It is preferable that gate valves be respectively arranged upstream and downstream of the back pressure valve on the exhaust gas route. A control unit may control the back pressure valve.

The first pressure is set in accordance with specifications of the manufacturing system, is normally a pressure higher than the atmospheric pressure, and is, for example, in a range of 300 KPa or higher to 700 KPa, preferably in a range of 400 KPa or higher to 700 KPa, and more preferably in a range of 500 KPa or higher to 700 KPa, in terms of a gauge pressure.

The second pressure is equal to or higher than the atmospheric pressure and equal to or lower than the first pressure, and is, for example, in a range of 50 KPa to 200 KPa in terms of a gauge pressure.

The third pressure has a value larger than that of the first pressure, and, for example, the difference between the first pressure and the third pressure is in a range of 50 KPa to 150 KPa in terms of a gauge pressure.

It is preferable that the compressor control the pressure of the exhaust gas on the basis of a measurement value obtained by a pressure gauge arranged on the exhaust gas route downstream side of the compressor. The control unit may control the compressor.

It is preferable that the exhaust gas flow rate regulating unit includes a gas flow rate meter and a gas flow rate regulating valve, and regulate the valve in accordance with a measurement value obtained by the gas flow rate meter to control the gas flow rate. The control unit may control the exhaust gas flow rate regulating unit.

The first impurity is an impurity having the highest content among components of the exhaust gas, and examples thereof include oxygen.

In the case where the first impurity is oxygen, the first impurity removing unit is, for example, a deoxidizing apparatus filled with a manganese oxide reactant or a copper oxide reactant. Examples of the manganese oxide reactant include reactants of manganese monoxide (MnO), reactants of manganese dioxide (MnO2), and manganese oxide reactants whose base is an adsorbent. Examples of the copper oxide reactant include reactants of copper oxide (CuO) and copper oxide reactants whose base is an adsorbent.

The second impurity is components obtained by removing the impurity having the highest content among the components of the exhaust gas, and examples thereof include nitrogen, carbon monoxide, carbon dioxide, water, and CF4.

In the case where the second impurity is components (nitrogen, carbon monoxide, carbon dioxide, water, and CF4) other than oxygen, the second impurity removing unit is, for example, a getter filled with a chemical adsorbent.

It is preferable that the first and second impurity removing units be arranged in accordance with the impurity contents of the exhaust gas (or the amount of impurity removable by each removing unit) and that the removing unit for removing an impurity having a higher content be arranged in the previous stage.

It is preferable that the pressure reducing valve control the pressure of the purified gas on the basis of a measurement value obtained by a pressure gauge arranged on the purified gas route downstream side of the pressure reducing valve. The control unit of the neon recovering/purifying system may control the pressure reducing valve.

It is preferable that the purified gas flow rate regulating unit includes a gas flow rate meter and a gas flow rate regulating valve, and regulate the valve in accordance with a measurement value obtained by the gas flow rate meter to control the gas flow rate. The control unit of the neon recovering/purifying system may control the purified gas flow rate regulating unit.

The exhaust gas route refers to a circulation route (pipe) for the exhaust gas from the discharge line or a position branched from the discharge line to the impurity removing unit.

The purified gas route refers to a circulation route (pipe) for the purified gas from the impurity removing unit to a position at which the purified gas route joins the supply line.

The supply line may further include a halogen supply line that supplies halogen (F2) gas at the first pressure.

As one embodiment of the first and second inventions, the neon recovering/purifying system further including a ventilation route that is a route for discharging the purified gas sent out from the second impurity removing unit, to an atmosphere. The ventilation route is provided so as to be branched from the purified gas route, and an automatic gate valve or a manual gate valve is arranged on the ventilation route. In the first invention, for example, in the case where the storage capacity of the pressure increasing vessel is exceeded, the automatic gate valve or the manual gate valve is opened, whereby the purified gas can be regulated to be discharged to the atmosphere.

A detection unit that detects the storage capacity can be provided to the pressure increasing vessel, and the control unit can control the automatic gate valve to be opened, on the basis of the detection by the detection unit.

As one embodiment of the first and second inventions, the first noble gas is krypton (Kr). In this case, the mixed noble gas is mixed noble gas of krypton and neon.

As one embodiment of the first and second inventions, the first noble gas is argon (Ar),
the mixed noble gas further contains xenon (Xe) as second noble gas, and
the neon recovering/purifying system further includes:
a xenon removing unit that removes the xenon, between the first impurity removing unit and the second impurity removing unit; and
an auxiliary noble gas supply route that supplies auxiliary noble gas of neon and xenon to the purified gas route at a position on the purified gas route downstream side of the purified gas flow rate regulating unit.

According to this configuration, in the case where the mixed noble gas contains xenon, the xenon removing unit is further provided. In the case where the first impurity is oxygen and where the other impurities are the second impurity, there is a high possibility that the content of xenon in the exhaust gas is lower than that of oxygen and higher than that of the second impurity. Hence, it is preferable to arrange the xenon removing unit between the first impurity removing unit and the second impurity removing unit. The xenon removing unit is, for example, filled with activated carbon or a zeolite-based adsorbent.

As one embodiment of the first and second inventions, the neon recovering/purifying system further including:
an auxiliary vessel that is arranged on the auxiliary noble gas supply route and stores the auxiliary noble gas of neon and xenon;
an auxiliary noble gas pressure reducing valve that is arranged on the auxiliary noble gas supply route and reduces a pressure of the auxiliary noble gas sent out from the auxiliary vessel, to the first pressure; and
an auxiliary noble gas flow rate regulating unit that is arranged on the auxiliary noble gas supply route and controls a supply amount of the auxiliary noble gas.

According to this configuration, the auxiliary noble gas contains neon as its main component and xenon whose content is a given rate (for example, 10%) to the total amount. Note that the auxiliary noble gas may contain a slight amount of impurities. According to this configuration, the auxiliary noble gas having a high content of xenon is mixed in the purified gas (whose main component is neon) from which xenon has been removed, whereby the purified gas can be regulated so as to have the same content of xenon as that in the mixed noble gas in the supply line.

It is preferable that the auxiliary noble gas pressure reducing valve control the pressure of the auxiliary noble gas on the basis of a measurement value obtained by a pressure gauge arranged on the auxiliary noble gas supply route downstream side of the auxiliary noble gas pressure reducing valve. The control unit of the neon recovering/purifying system may control the auxiliary noble gas pressure reducing valve.

It is preferable that the auxiliary noble gas flow rate regulating unit includes a gas flow rate meter and a gas flow rate regulating valve, and regulate the valve in accordance with a measurement value obtained by the gas flow rate meter to control the gas flow rate. The control unit of the neon recovering/purifying system may control the auxiliary noble gas flow rate regulating unit.

As one embodiment of the first and second inventions, the neon recovering/purifying system further including:
- a buffer vessel that is arranged on the discharge line and stores the exhaust gas that is discharged from the manufacturing system at the second pressure and contains at least oxygen; and
- a backup ventilation route that is a route for discharging the exhaust gas sent out from the buffer vessel, to the atmosphere.

The backup ventilation route is provided so as to be branched from the discharge line, and an automatic gate valve or a manual gate valve is arranged on the backup ventilation route. According to this configuration, for example, in the case where the storage capacity of the recovery vessel is exceeded, the automatic gate valve or the manual gate valve is opened, whereby the exhaust gas can be regulated to be discharged to the atmosphere.

A detection unit that detects the storage capacity can be provided to the recovery vessel, and the control unit can control the automatic gate valve to be opened, on the basis of the detection by the detection unit. Otherwise, in the case where the back pressure valve is not opened and where the storage capacity of the buffer vessel is exceeded, the automatic gate valve or the manual gate valve is opened, whereby the exhaust gas can be regulated to be discharged to the atmosphere. A detection unit that detects the storage capacity can be provided to the buffer vessel, and the control unit can control the automatic gate valve to be opened, on the basis of the detection by the detection unit.

As one embodiment of the first and second inventions, the neon recovering/purifying system further including:
- a supply vessel that is arranged on the supply line and stores the mixed noble gas;
- a pressure reducing valve that is arranged on the supply line and reduces a pressure of the mixed noble gas sent out from the supply vessel, to the first pressure; and
- a mixed noble gas flow rate regulating unit that is arranged on the supply line and regulates a flow rate of the mixed noble gas sent out from the supply vessel.

It is preferable that the mixed noble gas pressure reducing means be arranged between the supply vessel and the mixed noble gas flow rate regulating unit.

It is preferable that the mixed noble gas pressure reducing means control the pressure of the mixed noble gas on the basis of a measurement value obtained by a pressure gauge arranged on the supply line downstream side of the mixed noble gas pressure reducing means. A control unit of the manufacturing system or the control unit of the neon recovering/purifying system may control the mixed noble gas pressure reducing means.

Examples of the mixed noble gas pressure reducing means include a pressure reducing valve.

It is preferable that the mixed noble gas flow rate regulating unit includes a gas flow rate meter and a gas flow rate regulating valve, and regulate the valve in accordance with a measurement value obtained by the gas flow rate meter to control the gas flow rate.

It is preferable that the purified gas route be connected on the supply line downstream side of the mixed noble gas flow rate regulating unit.

According to an embodiment of each of the first and second inventions, the following configurations are given.

A first bypass line for the first impurity removing unit may be provided.

A second bypass line for the second impurity removing unit may be provided.

A third bypass line for the xenon removing unit may be provided.

The first to third bypass lines are each provided with a gate valve. At the time of a bypass process, the gate valve is opened.

The first impurity removing unit includes a gate valve at least upstream thereof.

The second impurity removing unit includes a gate valve at least upstream thereof.

The xenon removing unit includes a gate valve at least upstream thereof.

According to an embodiment of each of the first and second inventions, the supply gas and the purified gas may be simultaneously supplied to the manufacturing system, and only the purified gas may be supplied thereto.

According to an embodiment of each of the first and second inventions, the control unit of the neon recovering/purifying system may control respective elements on the basis of command signals from the control unit of the manufacturing system.

According to an embodiment of each of the first and second inventions, the xenon removing unit may include two xenon removing units arranged in parallel. An adsorbing process may be performed by one of the two xenon removing units, and a regenerating process may be performed by the other thereof.

According to an embodiment of each of the first and second inventions, the neon recovering/purifying system further includes a temperature regulating unit that regulates a temperature of the exhaust gas, on the exhaust gas route upstream side of the exhaust gas flow rate regulating unit. Examples of the temperature regulating unit include a heat exchanger.

According to an embodiment of the first invention, the temperature regulating unit is arranged on the exhaust gas route downstream side of the compressor, and is preferably arranged between the compressor and the exhaust gas flow rate regulating unit.

According to an embodiment of the second invention, the temperature regulating unit is arranged on the exhaust gas route downstream side of the pressure increasing vessel, and is preferably arranged between the pressure increasing vessel and the exhaust gas flow rate regulating unit.

According to this configuration, the exhaust gas temperature can be regulated to a predetermined temperature. For example, the exhaust gas temperature (for example, 60 to 80° C.) that has risen along with the pressure increase by the compressor can be regulated to the predetermined temperature (for example, 15 to 35° C.). Moreover, the exhaust gas temperature can be regulated to a temperature range suitable for removing actions of various removing units in the subsequent stage.

A neon recovering/purifying method as the third invention, of recovering and purifying neon from exhaust gas discharged from a manufacturing system including: a supply line that supplies mixed noble gas containing at least neon and first noble gas, at a first pressure; a laser apparatus that uses the mixed noble gas; and a discharge line that discharges at least exhaust gas discharged from the laser apparatus, at a second pressure that is equal to or higher than an atmospheric pressure and equal to or lower than the first pressure, the neon recovering/purifying method including:
- a first recovering step of storing the exhaust gas in a recovery vessel arranged on an exhaust gas route that is branched and extends from the discharge line;

a pressure increasing step of increasing a pressure of the exhaust gas sent out from the recovery vessel, to a third pressure;

an exhaust gas flow rate regulating step of regulating a flow rate of the exhaust gas whose pressure has been increased in the pressure increasing step;

a first impurity removing step of removing a first impurity from the exhaust gas whose flow rate has been regulated in the exhaust gas flow rate regulating step;

a second impurity removing step of removing a second impurity from the exhaust gas from which the first impurity has been removed in the first impurity removing step;

a second recovering step of storing purified gas that has been processed in the first impurity removing step and the second impurity removing step, in a pressure increasing vessel;

a pressure reducing step of reducing a pressure of the purified gas sent out from the pressure increasing vessel, to the first pressure; and a purified gas flow rate regulating step of regulating a flow rate of the purified gas whose pressure has been reduced in the pressure reducing step and that is supplied to the supply line of the manufacturing system.

According to this configuration, because the recovery vessel is provided, the exhaust gas can be stored. Then, when the amount of the exhaust gas reaches a given amount, the pressure of the exhaust gas can be increased to a given pressure equal to or higher than the first pressure, and the exhaust gas can be sent at a given flow rate in the exhaust gas flow rate regulating step to be continuously processed in the first impurity removing step and the second impurity removing step in the subsequent stage. Hence, the impurity removing process performance can be secured, and the purified gas of neon gas can be favorably obtained. Further, the purified gas can be stored in the pressure increasing vessel. Then, when the amount of the purified gas reaches a given amount, the pressure of the purified gas can be reduced in the pressure reducing step to the first pressure, and the purified gas can be sent at a given flow rate in the purified gas flow rate regulating step to the supply line. Hence, the mixing of the mixed noble gas and the purified gas can be controlled with high accuracy. As a result, in the manufacturing system such as a semiconductor manufacturing apparatus, it is possible to separate components other than neon from the exhaust gas, favorably recover neon, and supply the recovered neon to the manufacturing system again, while adopting a configuration simpler than conventional configurations.

A neon recovering/purifying method as the fourth invention, of recovering and purifying neon from exhaust gas discharged from a manufacturing system including: a supply line that supplies mixed noble gas containing at least neon and first noble gas, at a first pressure; a laser apparatus that uses the mixed noble gas; and a discharge line that discharges at least exhaust gas discharged from the laser apparatus, at a second pressure that is equal to or higher than an atmospheric pressure and equal to or lower than the first pressure, the neon recovering/purifying to method including:

a first recovering step of storing the exhaust gas in a recovery vessel arranged on an exhaust gas route that is branched and extends from the discharge line;

a pressure increasing step of increasing a pressure of the exhaust gas sent out from the recovery vessel, to a third pressure;

a second recovering step of storing the exhaust gas whose pressure has been increased in the pressure increasing step, in a pressure increasing vessel;

an exhaust gas flow rate regulating step of regulating a flow rate of the exhaust gas sent out from the pressure increasing vessel;

a first impurity removing step of removing a first impurity from the exhaust gas whose flow rate has been regulated in the exhaust gas flow rate regulating step;

a second impurity removing step of removing a second impurity from the exhaust gas from which the first impurity has been removed in the first impurity removing step;

a pressure reducing step of reducing a pressure of purified gas that has been processed in the second impurity removing step, to the first pressure; and a purified gas flow rate regulating step of regulating a flow rate of the purified gas whose pressure has been reduced in the pressure reducing step and that is supplied to the supply line of the manufacturing system.

According to this configuration, because the recovery vessel is provided, the exhaust gas can be stored. Then, when the amount of the exhaust gas reaches a given amount, the pressure of the exhaust gas can be increased by the compressor to a given pressure equal to or higher than the first pressure, the resultant exhaust gas can be stored in the pressure increasing vessel, and the stored exhaust gas can be sent at a given flow rate in the exhaust gas flow rate regulating step to be continuously processed in the first impurity removing step and the second impurity removing step in the subsequent stage. Hence, the impurity removing process performance can be secured, and the purified gas of neon gas can be favorably obtained. Further, the pressure of the purified gas can be reduced in the subsequent stage of the second impurity removing step, to the first pressure, and the purified gas can be sent at a given flow rate in the purified gas flow rate regulating step to the supply line. Hence, the mixing of the mixed noble gas and the purified gas can be controlled with high accuracy. As a result, it is possible to connect to the manufacturing system such as a semiconductor manufacturing apparatus, separate components other than neon from the exhaust gas, favorably recover neon, and supply the recovered neon to the manufacturing system again, while adopting a configuration simpler than conventional configurations.

In the fourth invention, it is preferable that the second recovering step include storing the exhaust gas whose pressure has been increased, in the pressure increasing vessel, immediately after the pressure increasing process in the pressure increasing step. The time required to store the exhaust gas whose pressure has been increased, in the pressure increasing vessel is within 5 minutes, preferably within 3 minutes, and more preferably within 1 minute.

As one embodiment of the third and fourth inventions, the method further including a discharging step of discharging the purified gas that has been processed in the second impurity removing step, from a ventilation route to an atmosphere.

As one embodiment of the third and fourth inventions,
the first noble gas is argon (Ar),
the mixed noble gas further contains xenon (Xe) as second noble gas, and
the neon recovering/purifying method further includes:
a xenon removing step of removing the xenon, between the first impurity removing step and the second impurity removing step; and an auxiliary noble gas supplying step of supplying auxiliary noble gas of neon and xenon to a purified gas route after the purified gas flow rate regulating step.

As one embodiment of the third and fourth inventions, the neon recovering/purifying method further including:

an auxiliary noble gas pressure reducing step of reducing a pressure of the auxiliary noble gas of neon and xenon to the first pressure; and an auxiliary noble gas flow rate regulating step of controlling a supply amount of the auxiliary noble gas.

According to an embodiment of each of the third and fourth inventions, the neon recovering/purifying method may further include a heat exchanging step of lowering a temperature of the exhaust gas, between the pressure increasing step and the exhaust gas flow rate regulating step.

BRIEF DESCRIPTION OF DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Neon Recovering/Purifying System

Figure 1:
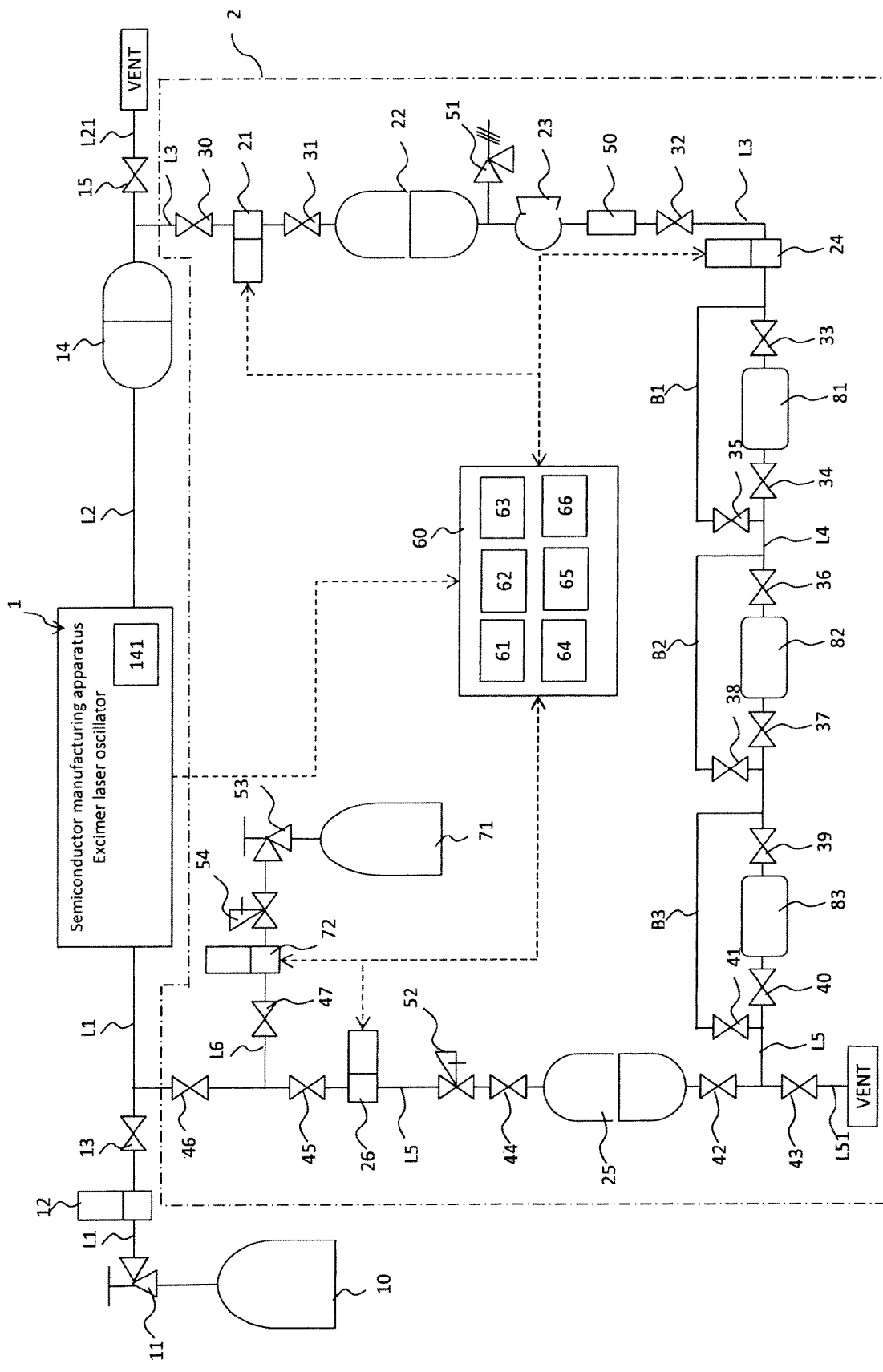
FIG. 1 is a diagram illustrating a configuration example of a manufacturing system and a neon recovering/purifying system of Embodiment 1.

A neon recovering/purifying system 2 of Embodiment 1 is described with reference to FIG. 1. The neon recovering/purifying system 2 is directly connected to a manufacturing system 1. In the present embodiment, the manufacturing system 1 includes an excimer laser oscillator, and uses mixed noble gas that is neon gas containing xenon and argon, as atmospheric gas. In the present embodiment, the mixed noble gas is, for example, gas containing neon as its main component, xenon at 5 to 50 ppm to the total amount, and argon at 3.0 to 4.0% to the total amount (the gas may contain impurities).

The mixed noble gas is supplied at a first pressure from a supply vessel 10 to a semiconductor manufacturing apparatus of the manufacturing system 1 through a supply line L1. The supply line L1 is provided with a supply valve 11, a mixed noble gas flow rate regulating unit 12, and a supply gate valve 13 in the stated order. The mixed noble gas flow rate regulating unit 12 includes a gas flow rate meter and a gas flow rate regulating valve, and regulates the valve in accordance with a measurement value obtained by the gas flow rate meter to control the gas flow rate. When a control unit of the manufacturing system supplies, for example, only purified gas (to be described later) to the semiconductor manufacturing apparatus, the supply gate valve 13 is controlled to be closed. The first pressure is set in accordance with specifications of the manufacturing system 1, and is, for example, 500 KPa to 700 KPa. A purified gas route L5 (to be described later) is connected on the supply line downstream side of the mixed noble gas flow rate regulating unit 12 and the supply gate valve 13.

Moreover, a halogen supply line (not illustrated) for supplying halogen is provided. Moreover, in the case where the pressure of the mixed noble gas inside of the supply vessel 10 is higher than the first pressure, the pressure of the mixed noble gas is reduced to the first pressure by a mixed noble gas pressure reducing valve (not illustrated) arranged upstream of the mixed noble gas flow rate regulating unit 12.

Exhaust gas discharged from the semiconductor manufacturing apparatus is discharged at a second pressure that is equal to or higher than an atmospheric pressure and equal to or lower than the first pressure. The second pressure is also set in accordance with the specifications of the manufacturing system. The second pressure is, for example, 50 to 100 KPa. Impurities are mixed in the discharged exhaust gas. Examples of the impurities include nitrogen, oxygen, carbon monoxide, carbon dioxide, water, and CF4.

The exhaust gas is discharged through a discharge line L2 connected to the semiconductor manufacturing apparatus. The discharge line L2 is provided with a buffer vessel 14, and the exhaust gas is stored in the buffer vessel 14 at a given amount. Because the buffer vessel 14 is provided, a predetermined amount of exhaust gas can be continuously sent to a recovery vessel 22 in the subsequent stage.

Moreover, in the case where the exhaust gas is not sent from the buffer vessel 14 to the recovery vessel 22 in the subsequent stage, a first gate valve 30 is closed, and a backup ventilation valve 15 arranged on a backup ventilation route L21 is opened, whereby the exhaust gas can be discharged to the atmosphere. The control unit 141 of the manufacturing system controls the backup ventilation valve 15 to be opened, on the basis of detection by a detection unit that is provided to the buffer vessel 14 and detects the storage capacity thereof.

An exhaust gas route L3 is branched from the discharge line L2 upstream of the backup ventilation valve 15. The exhaust gas route L3 is provided with the first gate valve 30, a back pressure valve (back pressure regulator) 21, a second gate valve 31, and the recovery vessel 22 in the stated order. The backup ventilation valve 15 is closed, and the first gate valve 30, the back pressure valve (back pressure regulator) 21, and the second gate valve 31 are opened, whereby the exhaust gas is stored in the recovery vessel 22. A valve controlling unit 61 controls valve opening/closing of the first gate valve 30, the back pressure valve (back pressure regulator) 21, and the second gate valve 31.

A portion of the exhaust gas route L3 downstream of the recovery vessel 22 is provided with a compressor 23, a heat exchanger 50, a third gate valve 32, and an exhaust gas flow rate regulating unit 24 in the stated order. The portion of the exhaust gas route L3 is provided with a safety valve 51 upstream of the compressor 23.

The compressor 23 increases the pressure of the exhaust gas sent out from the recovery vessel 22, to a third pressure. The third pressure is, for example, a pressure higher by 50 KPa to 150 KPa than the first pressure. A pressure controlling unit 62 controls the pressure of the exhaust gas on the basis of a measurement value obtained by a pressure gauge incorporated in the compressor 23 or a pressure gauge arranged downstream of the compressor 23.

The heat exchanger 50 lowers the temperature of the exhaust gas to a predetermined temperature. The heat exchanger 50 can lower the exhaust gas temperature (for example, 60 to 80° C.) that has risen along with the pressure increase by the compressor 23, to the predetermined temperature (for example, 15 to 35° C.), and, for example, the heat exchanger 50 lowers the exhaust gas temperature to a temperature range suitable for removing actions of various removing units in the subsequent stage. A gas temperature controlling unit 63 controls the temperature of the exhaust gas on the basis of a measurement value obtained by a gas temperature gauge incorporated in the heat exchanger 50 or a gas temperature gauge arranged downstream of the heat exchanger 50. The valve controlling unit 61 controls valve opening/closing of the third gate valve 32.

The exhaust gas flow rate regulating unit 24 regulates the flow rate of the exhaust gas sent to an oxygen removing unit 81 in the subsequent stage. The exhaust gas flow rate regulating unit 24 includes a gas flow rate meter and a gas flow rate regulating valve, and an exhaust gas flow rate controlling unit 64 regulates the gas flow rate regulating valve in accordance with a measurement value obtained by the gas flow rate meter to control the flow rate of the exhaust gas.

An exhaust gas route L4 downstream of the exhaust gas flow rate regulating unit 24 is provided with the oxygen removing unit 81, a xenon removing unit 82, and an impurity removing unit 83 in the stated order.

The oxygen removing unit 81 is a deoxidizing apparatus that removes oxygen from the exhaust gas and is filled with a manganese oxide reactant. Examples of the manganese oxide reactant include reactants of manganese monoxide (MnO) and reactants of manganese dioxide (MnO2). An inlet valve 33 and an outlet valve 34 are respectively arranged upstream and downstream of the oxygen removing unit 61, and a first bypass line B1 is provided so as to be branched from the exhaust gas route L4 upstream of the inlet valve 33 and join the exhaust gas route L4 downstream of the outlet valve 34. The first bypass line B1 is provided with a first bypass valve 35. In the case where the oxygen removing unit 81 is not used, the inlet valve 33 and the outlet valve 34 are closed, and the first bypass line B1 is opened. The valve controlling unit 61 controls valve opening/closing of the inlet valve 33, the outlet valve 34, and the first bypass valve 35.

The xenon removing unit 82 is a xenon removing apparatus that removes xenon and is filled with activated carbon. An inlet valve 36 and an outlet valve 37 are respectively arranged upstream and downstream of the xenon removing unit 82, and a second bypass line B2 is provided so as to be branched from the exhaust gas route L4 upstream of the inlet valve 36 and join the exhaust gas route L4 downstream of the outlet valve 37. The second bypass line B2 is provided with a second bypass valve 38. In the case where the xenon removing unit 82 is not used, the inlet valve 36 and the outlet valve 37 are closed, and the second bypass line B2 is opened. The valve controlling unit 61 controls valve opening/closing of the inlet valve 36, the outlet valve 37, and the second bypass valve 38.

The impurity removing unit 83 is a getter that removes impurities (for example, nitrogen, carbon monoxide, carbon dioxide, water, and CF4) other than oxygen and xenon and is filled with a chemical adsorbent. An inlet valve 39 and an outlet valve 40 are respectively arranged upstream and downstream of the impurity removing unit 83, and a third bypass line B3 is provided so as to be branched from the exhaust gas route L4 upstream of the inlet valve 39 and join a purified gas route L5 downstream of the outlet valve 40. The third bypass line B3 is provided with a third bypass valve 41. In the case where the impurity removing unit 83 is not used, the inlet valve 39 and the outlet valve 40 are closed, and the third bypass line B3 is opened. The valve controlling unit 61 controls valve opening/closing of the inlet valve 39, the outlet valve 40, and the third bypass valve 41.

The gas that has passed through the impurity removing unit 83 is purified gas (neon gas) from which oxygen, xenon, and the impurities have been removed. The purified gas is supplied to the supply line L1 through the purified gas route L5. In the case where the purified gas is not sent to a pressure increasing vessel 25 (to be described later), a fourth gate valve 42 is closed, and a ventilation valve 43 arranged on a purified gas ventilation route L51 is opened, whereby the purified gas can be discharged to the atmosphere.

For example, the valve controlling unit 61 controls the fourth gate valve 42 to be closed and the ventilation valve 43 to be opened, on the basis of detection by a detection unit that is provided to the pressure increasing vessel 25 and detects the storage capacity thereof.

The purified gas route L5 is provided with the fourth gate valve 42, the pressure increasing vessel 25, a fifth gate valve 44, a pressure reducing valve 52, a purified gas flow rate regulating unit 26, a sixth gate valve 45, and a seventh gate valve 46 in the stated order.

The pressure increasing vessel 25 stores the purified gas. The pressure increasing vessel 25 can send a predetermined amount of purified gas to the supply line L1 by storing the purified gas up to the predetermined amount.

The pressure controlling unit 65 controls the pressure reducing valve 52 on the basis of a measurement value obtained by a pressure gauge arranged on the downstream side on the purified gas route L5 or a pressure gauge incorporated in the pressure reducing valve 52, to thereby control the pressure of the purified gas. The purified gas in the pressure increasing vessel 25 is gas at the third pressure, and hence the pressure of the purified gas needs to be reduced to the same pressure (first pressure) as that of the supply gas in the supply line L1.

The purified gas flow rate regulating unit 26 includes a gas flow rate meter and a gas flow rate regulating valve, and a purified gas controlling unit 66 regulates the gas flow rate regulating valve in accordance with a measurement value obtained by the gas flow rate meter to control the flow rate of the purified gas. Accordingly, the supply amount of the purified gas sent to the supply line L1 can be controlled to be constant.

An auxiliary noble gas supply route L6 is provided so as to join the purified gas route L5 downstream of the sixth gate valve 45. The auxiliary noble gas supply route L6 is provided with an auxiliary vessel 71 filled with auxiliary noble gas of neon and xenon, a supply valve 53, an auxiliary noble gas pressure reducing valve 54, an auxiliary noble gas flow rate regulating unit 72, and an eighth gate valve 47 in the stated order.

The auxiliary noble gas is gas containing neon as its main component and xenon whose content is a given rate (for example, 10%) to the total amount. Note that the auxiliary noble gas may contain a slight amount of impurities.

The pressure controlling unit 65 controls the auxiliary noble gas pressure reducing valve 54 on the basis of a measurement value obtained by a pressure gauge arranged on the downstream side on the auxiliary noble gas supply route L6 or a pressure gauge incorporated in the pressure reducing valve 54, to thereby control the pressure of the auxiliary noble gas.

In the case where the pressure of the auxiliary noble gas inside of the auxiliary vessel 71 is higher than the first pressure, the pressure of the auxiliary noble gas is reduced to the first pressure.

The auxiliary noble gas flow rate regulating unit includes a gas flow rate meter and a gas flow rate regulating valve, and the purified gas controlling unit 66 regulates the gas flow rate regulating valve in accordance with a measurement value obtained by the gas flow rate meter to control the flow rate of the auxiliary noble gas. The purified gas controlling unit 66 controls the flow rate of the auxiliary noble gas and the flow rate of the purified gas so as to obtain xenon-containing gas (whose main component is neon) having the same blend ratio as that of the mixed noble gas (argon, xenon, and neon). The purified gas and the auxiliary noble gas are mixed with each other in a pipe of the purified gas route L5, and the mixed gas is sent to the supply line L1. The valve controlling unit 61 controls valve opening/closing of the supply valve 53 and the eighth gate valve 47.

A control unit 60 may include hardware such as a CPU (or a MPU), circuits, firmware, and memories that store software programs. The control unit 60 has functions of the control units respectively denoted by reference signs 61 to 66.

Other Embodiments

Although the xenon-containing mixed noble gas is described in the present embodiment, the present invention is not limited thereto. In the case where the exhaust gas is mixed noble gas not containing xenon, the xenon removing unit 82, the auxiliary noble gas supply route L6, the auxiliary vessel 71, the supply valve 53, the auxiliary noble gas pressure reducing valve 54, the auxiliary noble gas flow rate regulating unit 72, and the eighth gate valve 47 are unnecessary. In this case, the second bypass line B2 is used, and the eighth gate valve 47 and the like are closed, whereby the unnecessary components can be caused not to function at the time of a purification process.

Although the number of the xenon removing units 82 is one in the present embodiment, the number of the xenon removing units may be two, and the two xenon removing units may be arranged in parallel. A removing process may be performed by one of the two xenon removing units, and a regenerating process may be performed by the other thereof.

Although the heat exchanger 50 is provided in the present embodiment, the heat exchanger 50 may not be provided.

In the present embodiment, the mixed noble gas flow rate regulating unit 12 and the supply gate valve 13 arranged on the supply line L1 may constitute part of the neon recovering/purifying system 2. In this case, the control unit 60 controls the mixed noble gas flow rate regulating unit 12 and the supply gate valve 13.

In the present embodiment, the buffer vessel 14 and the backup ventilation valve 15 arranged on the discharge line L2 may constitute part of the neon recovering/purifying system 2. In this case, the control unit 60 controls the buffer vessel 14 and the backup ventilation valve 15.

Embodiment 2

Figure 2:
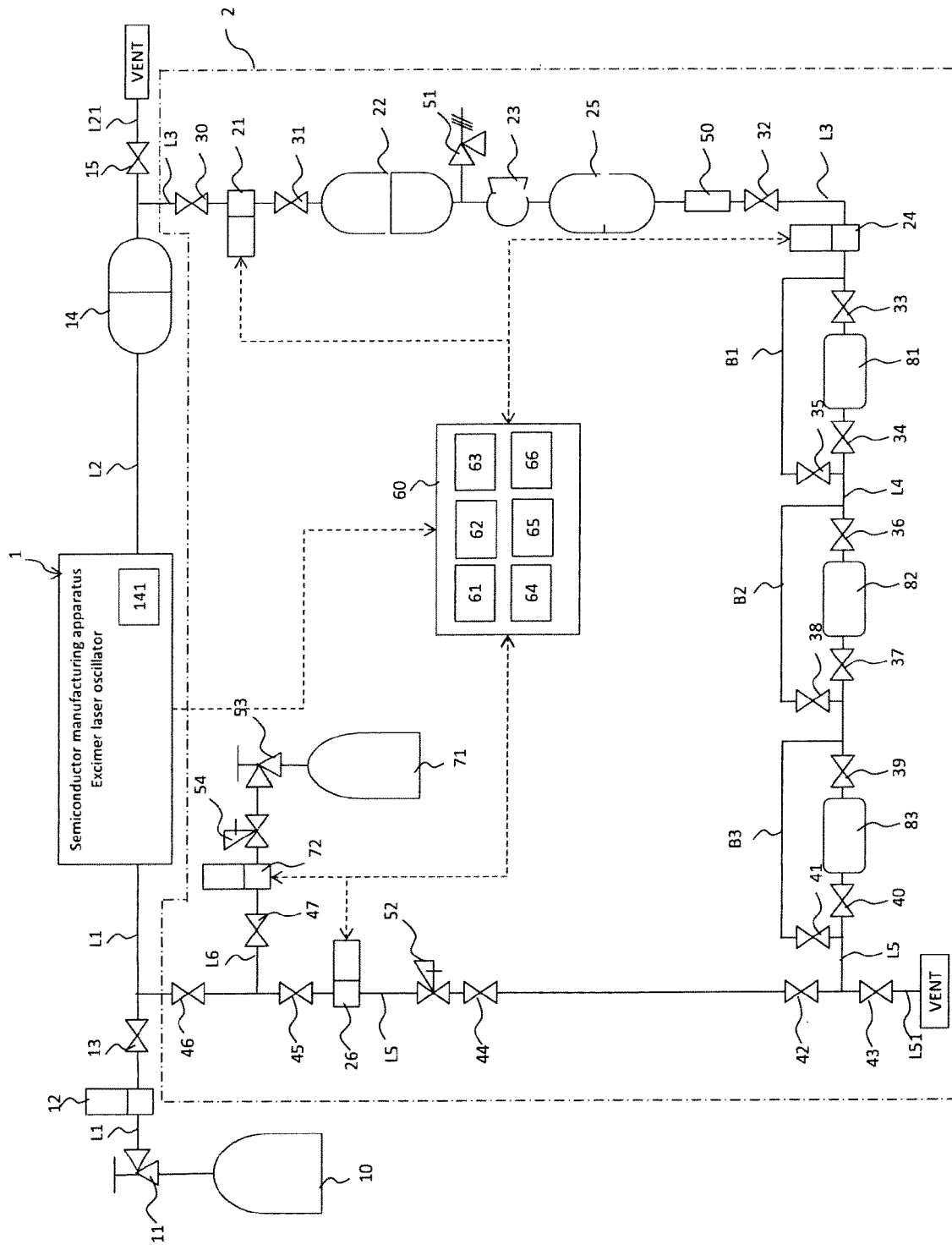
FIG. 2 is a diagram illustrating a configuration example of a manufacturing system and a neon recovering/purifying system of Embodiment 2.

A neon recovering/purifying system of Embodiment 2 is described with reference to FIG. 2. The same reference signs as those in Embodiment 1 denote the same functions as those in Embodiment 1. In Embodiment 2, the pressure increasing vessel 25 is arranged in the subsequent stage of the compressor 23.

The pressure increasing vessel 25 is arranged in the immediate vicinity of the compressor 23 on the exhaust gas route downstream side, and stores the exhaust gas whose pressure has been increased by the compressor 23. The exhaust gas flow rate regulating unit 24 is arranged on the exhaust gas route downstream side of the pressure increasing vessel 25, and regulates the flow rate of the exhaust gas sent to the exhaust gas route downstream side. The pressure reducing valve 52 is arranged on the purified gas route downstream side of the impurity removing unit 83, and reduces the pressure of the purified gas sent out from the impurity removing unit 83, to the first pressure.

The Neon Recovering/Purifying Method

The embodiment according to the neon recovering/purifying method of recovering and purifying neon from exhaust gas discharged from a manufacturing system includes a supply line that supplies mixed noble gas containing at least neon and first noble gas, at a first pressure; a laser apparatus that uses the mixed noble gas; and a discharge line that discharges at least exhaust gas discharged from the laser apparatus, at a second pressure that is equal to or higher than an atmospheric pressure and equal to or lower than the first pressure.

The first neon recovering/purifying method includes:
a first recovering step of storing the exhaust gas in a recovery vessel arranged on an exhaust gas route that is branched and extends from the discharge line;
a pressure increasing step of increasing a pressure of the exhaust gas sent out from the recovery vessel, to a third pressure;
an exhaust gas flow rate regulating step of regulating a flow rate of the exhaust gas whose pressure has been increased in the pressure increasing step;
a first impurity removing step of removing a first impurity from the exhaust gas whose flow rate has been regulated in the exhaust gas flow rate regulating step;
a second impurity removing step of removing a second impurity from the exhaust gas from which the first impurity has been removed in the first impurity removing step;
a second recovering step of storing purified gas that has been processed in the first impurity removing step and the second impurity removing step, in a pressure increasing vessel;
a pressure reducing step of reducing a pressure of the purified gas sent out from the pressure increasing vessel, to the first pressure; and
a purified gas flow rate regulating step of regulating a flow rate of the purified gas whose pressure has been reduced in the pressure reducing step and that is supplied to the supply line of the manufacturing system.

The second neon recovering/purifying method includes:
a first recovering step of storing the exhaust gas in a recovery vessel arranged on an exhaust gas route that is branched and extends from the discharge line;
a pressure increasing step of increasing a pressure of the exhaust gas sent out from the recovery vessel, to a third pressure;
a second recovering step of storing the exhaust gas whose pressure has been increased in the pressure increasing step, in a pressure increasing vessel;
an exhaust gas flow rate regulating step of regulating a flow rate of the exhaust gas sent out from the pressure increasing vessel;
a first impurity removing step of removing a first impurity from the exhaust gas whose flow rate has been regulated in the exhaust gas flow rate regulating step;
a second impurity removing step of removing a second impurity from the exhaust gas from which the first impurity has been removed in the first impurity removing step;
a pressure reducing step of reducing a pressure of purified gas that has been processed in the second impurity removing step, to the first pressure; and a purified gas flow rate regulating step of regulating a flow rate of the purified gas whose pressure has been reduced in the pressure reducing step and that is supplied to the supply line of the manufacturing system.

According to the above-mentioned embodiment, the neon recovering/purifying method may further include a heat exchanging step of lowering a temperature of the exhaust gas, between the pressure increasing step and the exhaust gas flow rate regulating step.

According to the above-mentioned embodiment, the neon recovering/purifying method may further include a discharging step of discharging the purified gas that has been processed in the second impurity removing step, from a ventilation route to an atmosphere.

According to the above-mentioned embodiment, the first noble gas is argon (Ar),
the mixed noble gas further contains xenon (Xe) as second noble gas, and
the neon recovering/purifying method may further include:
a xenon removing step of removing the xenon, between the first impurity removing step and the second impurity removing step; and
an auxiliary noble gas supplying step of supplying auxiliary noble gas of neon and xenon to a purified gas route after the purified gas flow rate regulating step.

According to the above-mentioned embodiment, the neon recovering/purifying method may further include: a buffer step of storing the exhaust gas that is discharged from the manufacturing system at the second pressure and contains at least oxygen, in a buffer vessel arranged in the discharge line; and a backup ventilation step of discharging the exhaust gas sent out from the buffer vessel from a backup ventilation route to the atmosphere.

According to the above-mentioned embodiment, the neon recovering/purifying method may further include: a storing step of storing, on the supply line, the mixed noble gas in a supply vessel; a pressure reducing step of reducing, on the supply line, a pressure of the mixed noble gas sent out from the supply vessel to the first pressure; and a mixed noble gas flow rate regulating step of regulating, on the supply line, a flow rate of the mixed noble gas sent out from the supply vessel.

REFERENCE SIGNS LIST 1 semiconductor manufacturing system
2 neon recovering/purifying system
10 supply vessel
14 buffer vessel
21 back pressure valve
22 recovery vessel
23 compressor
24 exhaust gas flow rate regulating unit
25 pressure increasing vessel
26 purified gas flow rate regulating unit
61 oxygen removing unit
62 xenon removing unit
63 impurity removing unit
L1 supply line
L2 discharge line
L3, L4 exhaust gas route
L5 purified gas route It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A neon recovering/purifying system that recovers and purifies neon from exhaust gas discharged from a manufacturing system including: a supply line that supplies mixed noble gas containing at least neon and first noble gas, at a first pressure; a laser apparatus that uses the mixed noble gas; and a discharge line that discharges at least exhaust gas discharged from the laser apparatus, at a second pressure that is equal to or higher than an atmospheric pressure and equal to or lower than the first pressure, the neon recovering/purifying system comprising:
a recovery vessel that is arranged on an exhaust gas route and stores the exhaust gas, the exhaust gas route being branched and extending from the discharge line;
a compressor that is arranged on an exhaust gas route downstream side of the recovery vessel and increases a pressure of the exhaust gas sent out from the recovery vessel, to a third pressure;
an exhaust gas flow rate regulating unit that is arranged on the exhaust gas route downstream side of the compressor and regulates a flow rate of the exhaust gas that is sent to the exhaust gas route downstream side and whose pressure has been increased by the compressor;
a first impurity removing unit that is arranged on the exhaust gas route downstream side of the exhaust gas flow rate regulating unit and removes a first impurity from the exhaust gas;
a second impurity removing unit that is arranged on the exhaust gas route downstream side of the first impurity removing unit and removes a second impurity from the exhaust gas from which the first impurity has been removed;
a pressure increasing vessel that is arranged on a purified gas route downstream side of the second impurity removing unit and stores purified gas that has been processed by the first impurity removing unit and the second impurity removing unit;
pressure reducing means that is arranged on the purified gas route downstream side of the pressure increasing vessel and reduces a pressure of the purified gas sent out from the pressure increasing vessel, to the first pressure; and
a purified gas flow rate regulating unit that is arranged on the purified gas route downstream side of the pressure reducing means and regulates a flow rate of the purified gas supplied to the supply line of the manufacturing system.

2. The neon recovering/purifying system according to claim 1, further comprising a ventilation route that is a route for discharging the purified gas sent out from the second impurity removing unit, to an atmosphere.

3. The neon recovering/purifying system according to claim 1, wherein the first noble gas is krypton (Kr).

4. The neon recovering/purifying system according to claim 1, wherein
the first noble gas is argon (Ar),
the mixed noble gas further contains xenon (Xe) as second noble gas, and
the neon recovering/purifying system further comprises:
a xenon removing unit that removes the xenon, between the first impurity removing unit and the second impurity removing unit; and an auxiliary noble gas supply route that supplies auxiliary noble gas of neon and xenon to the purified gas route at a position on the purified gas route downstream side of the purified gas flow rate regulating unit.

5. The neon recovering/purifying system according to claim 4, further comprising:
an auxiliary vessel that is arranged on the auxiliary noble gas supply route and stores the auxiliary noble gas of neon and xenon;
an auxiliary noble gas pressure reducing valve that is arranged on the auxiliary noble gas supply route and reduces a pressure of the auxiliary noble gas sent out from the auxiliary vessel, to the first pressure; and
an auxiliary noble gas flow rate regulating unit that is arranged on the auxiliary noble gas supply route and controls a supply amount of the auxiliary noble gas.

6. The neon recovering/purifying system according to claim 1, further comprising:
a buffer vessel that is arranged on the discharge line and stores the exhaust gas that is discharged from the manufacturing system at the second pressure and contains at least oxygen; and
a backup ventilation route that is a route for discharging the exhaust gas sent out from the buffer vessel, to the atmosphere.

7. The neon recovering/purifying system according to claim 1, further comprising:
a supply vessel that is arranged on the supply line and stores the mixed noble gas;
a pressure reducing valve that is arranged on the supply line and reduces a pressure of the mixed noble gas sent out from the supply vessel, to the first pressure; and
a mixed noble gas flow rate regulating unit that is arranged on the supply line and regulates a flow rate of the mixed noble gas sent out from the supply vessel.

8. The neon recovering/purifying system according to claim 1, further comprising a temperature regulating unit that is arranged on the exhaust gas route downstream side of the compressor and regulates a temperature of the exhaust gas.

9. The neon recovering/purifying system according to claim 1, wherein the recovery vessel stores the exhaust gas via pressure regulating means arranged on the exhaust gas route that is branched and extends from the discharge line.

10. A method of recovering and purifying neon from exhaust gas discharged from a manufacturing system including: a supply line that supplies mixed noble gas containing at least neon and first noble gas, at a first pressure; a laser apparatus that uses the mixed noble gas; and a discharge line that discharges at least exhaust gas discharged from the laser apparatus, at a second pressure that is equal to or higher than an atmospheric pressure and equal to or lower than the first pressure, the neon recovering/purifying method comprising:
a first recovering step of storing the exhaust gas in a recovery vessel arranged on an exhaust gas route that is branched and extends from the discharge line;
a pressure increasing step of increasing a pressure of the exhaust gas sent out from the recovery vessel, to a third pressure;
an exhaust gas flow rate regulating step of regulating a flow rate of the exhaust gas whose pressure has been increased in the pressure increasing step;
a first impurity removing step of removing a first impurity from the exhaust gas whose flow rate has been regulated in the exhaust gas flow rate regulating step;
a second impurity removing step of removing a second impurity from the exhaust gas from which the first impurity has been removed in the first impurity removing step;
a second recovering step of storing purified gas that has been processed in the first impurity removing step and the second impurity removing step, in a pressure increasing vessel;
a pressure reducing step of reducing a pressure of the purified gas sent out from the pressure increasing vessel, to the first pressure; and
a purified gas flow rate regulating step of regulating a flow rate of the purified gas whose pressure has been reduced in the pressure reducing step and that is supplied to the supply line of the manufacturing system.

11. The method according to claim 10, further comprising a discharging step of discharging the purified gas that has been processed in the second impurity removing step, from a ventilation route to an atmosphere.

12. The method according to claim 10, wherein the first noble gas is krypton (Kr).

13. The method according to claim 10, wherein
the first noble gas is argon (Ar),
the mixed noble gas further contains xenon (Xe) as second noble gas, and
the neon recovering/purifying method further comprises:
a xenon removing step of removing the xenon, between the first impurity removing step and the second impurity removing step; and
an auxiliary noble gas supplying step of supplying auxiliary noble gas of neon and xenon to a purified gas route after the purified gas flow rate regulating step.

14. The method according to claim 10, further comprising:
an auxiliary noble gas pressure reducing step of reducing a pressure of the auxiliary noble gas of neon and xenon to the first pressure; and
an auxiliary noble gas flow rate regulating step of controlling a supply amount of the auxiliary noble gas.

15. The method according to claim 10, further comprising a temperature regulating step of regulating a temperature of the exhaust gas, before the exhaust gas flow rate regulating step.

16. The neon recovering/purifying system according to claim 1, wherein the first impurity removing unit removes oxygen from the exhaust gas.

17. The neon recovering/purifying system according to claim 16, wherein the first impurity removing unit is a deoxidizing apparatus filled with a manganese oxide reactant or a copper oxide reactant.

18. The neon recovering/purifying system according to claim 1, wherein the second impurity removing unit is a getter filled with a chemical adsorbent.

19. The method according to claim 10, wherein the first impurity removing step removes oxygen from the exhaust gas.

* * * * *